Patented Oct. 17, 1950

2,526,299

UNITED STATES PATENT OFFICE 2,526,299

FRIT SUSPENSION AND METHOD OF MAKING AND APPLYING

Stanley George Tinsley, Billingham, England, assignor to National Lead Company, New York, N. Y., a corporation of New Jersey No Drawing. Application February 13, 1947, Serial No. 728,371. In Great Britain March 29, 1943

4 Claims. (Cl. 106—48)

This invention relates to the production of a composition suitable for use in preparing vitreous enamel coatings on sheet metal.

The first stage in the process of vitreous enamelling is the preparation of an enamel frit. This enamel frit is usually prepared by mixing the ingredients for the enamel and smelting in a frit-making furnace at temperatures of 1000° to 1150° C. until a homogeneous melt is obtained, which is then quenched by pouring it into water. The enamel frit is then finely ground with water and clay in a ball mill until a smooth slip is obtained which can be applied to sheet metal by spraying or dipping. It is essential, at this stage, that the slip consist of a smooth uniform suspension of the ingredients and stability of the suspension is usually accomplished by grinding the frit in the presence of clay as described. After drying, the enamel is usually fused at 700° to 850° C. to form a smooth vitreous coating on the metal.

Such vitreous enamels may be opacified very efficiently by the incorporation of titanium oxide in the frit composition, with or without further additions of titanium oxide in the mill.

A disadvantage of enamels opacified in this way with titanium oxide is that when clay is used to suspend the ground frit particles in the slip, the fused white enamel coating has a distinctly creamy tone. This cream tone can be reduced by decreasing the percentage of clay added at the mill to suspend the enamel frit particles but this leads to difficulties in the application of the wet enamel to the ware. It can also be reduced by replacing part of the clay with small amounts of a highly plastic clay, such as bentonite. The cream tone can also be partly masked by the use of larger additions of titanium oxide in the mill, but such additions tend to give enamels of poor gloss. Furthermore, none of the methods so far described entirely removes the discoloration but only minimizes it.

Complete neutralization of the creaminess can be attained by the addition of small amounts of blue or violet coloured oxides, for example, those of cobalt and manganese, to the frit, but this treatment is invariably accompanied by a loss of brightness in the fired enamel.

It has also been proposed to use alumina gel precipitated by the addition of small quantities of hydrochloric acid or other suitable electrolytes to sodium aluminate solution for suspending the enamel frit particles. In this way, the use of clay is eliminated altogether and the fused enamel is a neutral white, but the gel produced in this manner is not uniform on account of the speed at which it is precipitated from the aluminate solution, and in consequence the slip is not uniform in consistency, and is difficult to apply to the ware.

The present invention provides a method of preparing from an enamel frit, a liquid suspension or slip suitable for use in vitreous enamelling, which consists in suspending the frit particles in a compound inorganic gel formed by the reaction of an alkali metal silicate with one or more alkali metal aluminates and/or borates.

More particularly, the method according to the invention consists in preparing an enamel frit opacified with titanium oxide, and grinding the frit in the presence of a solution of an alkali metal silicate and a solution of one or more alkali aluminates and/or borates.

The type of compound inorganic gel used in the practice of this invention is formed by the reaction of preferably sodium silicate with preferably either sodium aluminate and/or sodium borate. Such gels should not be confused with those obtained by precipitating a gel from an alkali metal silicate solution such as sodium silicate, by the use of an acid. The simple and well known silica gel of this type may be used as a suspending agent but its use is accompanied by the disadvantage noted above.

The gels used in the practice of this invention are not as well known. However, they have been mentioned in the chemical literature as for instance by Mellor in his "Inorganic and Theoretical Chemistry," vol. 6, pages 322 and 323. It has been found that when an alkali metal silicate solution is reacted with an alkali metal aluminate or borate solution as hereinafter described in more detail a compound gel is apparently slowly formed and which is particularly useful as a suspending agent for enamel ingredients.

The compound gel used in the practice of this invention is preferably made from a sodium silicate solution. Such solutions are available commercially and should contain a ratio of $Na_2O$ to $SiO_2$ of generally between 1:1 and 1:4 on a molecular basis. The concentration of the sodium silicate solution may be varied between wide limits, however, and containing from 15 to 80 and preferably about 35.2 grams per liter of $SiO_2$ will be found convenient.

The aluminate or borate solution may be of convenient concentration, for instance, containing about 38.9 grams per liter of $Al_2O_3$; or a 5% to 10% solution of borax (sodium tetraborate). In general a solution containing from about .15 mol to about 3 mols of $Al_2O_3$ or $B_2O_3$ for each mol of $SiO_2$ in the silicate solution will form a satisfactory gel.

It will in general be found that as the proportion of $SiO_2$ is increased (a) the firmness of the gel increases, (b) rate of gelation decreases, and it will be found that the rate of gelation is somewhat slower with the sodium borate-sodium silicate mixture than with the sodium aluminate-sodium silicate mixture. These properties will serve as a guide for producing gels of varying characteristics which will be useful in application of the invention under specific conditions. Titanium oxide opacified enamel frits suspended in this fashion have uniform properties and when fired produce enamels which are neutral white and show no trace of cream tone. These compound gels are superior in suspending power to the single gels precipitated from aluminate solutions by the addition of electrolytes, since the rate of precipitation is slow and uniform. Furthermore, the consistency of the milled enamel slip can be varied at will by increasing or decreasing the amount of reagents used to produce the gel. Coatings can therefore be applied at any desired thickness by the usual dipping or spraying procedure. The slips are also quite stable and the consistency of the slip remains constant over periods of many days. The quantities of alkali metal silicate and the alkali metal aluminates and/or borates required are small and in consequence a high order of gloss is obtained in the fired enamels.

The following is a description by way of example of three methods embodying the present invention.

Example I

A titanium oxide opacified enamel frit is prepared by smelting a batch made by thoroughly mixing the following ingredients:

|   | Grams |
|---|---|
| Felspar | 260 |
| Borax | 220 |
| Quartz | 260 |
| Sodium nitrate | 40 |
| Cryolite | 60 |
| Zinc oxide | 40 |
| Barium carbonate | 10 |
| Titanium oxide | 90 |

To 100 grams of this frit is added 10 cc. of a solution of sodium silicate containing 35.2 grams of $SiO_2$ per liter and 10 cc. of a solution of sodium aluminate containing 38.9 grams of $Al_2O_3$ per liter. 2 grams of titanium oxide are also added. A further 10 cc. of water are added and the batch ground in a ball mill in the usual way until the desired degree of fineness has been obtained. The enamel slip thus obtained has a degree of set equal to that obtained by the use of clay and can be adjusted to spraying consistency by the addition of water. Dark ground coated enamelled iron sheets are sprayed to give a weight of dried enamel of 25 grams per square foot. The coating is then dried and fired at 850° C. The resulting enamel has a brightness of 77% and is neutral white. The same enamel suspended with 5% of pipe clay in place of the compound alumina silica gel but with 2 grams of titanium oxide also added at the mill has a brightness of 73% and a slight cream tone.

Example II

To 100 grams of frit prepared by smelting a batch of the following ingredients:

|   | Grams |
|---|---|
| Felspar | 290 |
| Borax | 255 |
| Quartz | 195 |
| Sodium carbonate | 35 |
| Sodium nitrate | 45 |
| Potassium nitrate | 30 |
| Cryolite | 30 |
| Zinc oxide | 35 |
| Titanium oxide | 100 | is added 10 cc. of a solution of sodium aluminate containing 38.9 grams of $Al_2O_3$ per liter and 20 cc. of a solution of sodium silicate containing 35.2 grams of $SiO_2$ per liter. 2 grams of titanium oxide are also added. A further 10 cc. of water are added and the batch ground in a ball mill, until the desired degree of fineness has been obtained. Dark ground coated enamelled iron sheets are sprayed to give a weight of dried enamel of 25 grams per square foot, dried and fired at 800° C. The resulting enamel has a brightness of 72% and is neutral white. The same enamel, suspended with 3% of pipe clay and ½% of bentonite in place of the compound alumina silica gel but with 2 grams of titanium oxide also added at the mill, has a brightness of 72% but a distinct cream tone.

Example III

A titanium oxide opacified enamel frit is prepared by smelting a batch made by thoroughly mixing the following ingredients:

|   | Grams |
|---|---|
| Felspar | 240 |
| Borax | 333 |
| Quartz | 190 |
| Sodium nitrate | 95 |
| Sodium silicofluoride | 20 |
| Zinc oxide | 30 |
| Titanium oxide | 100 |

To 100 grams of this frit is added 15 cc. of a solution of sodium silicate containing 35.2 grams of $SiO_2$ per liter and 30 cc. of a 5% hydrated borax solution. The batch is then ground in a ball mill in the usual way until the desired degree of fineness has been obtained. The enamel slip thus obtained has a consistency equal to that obtained by the use of clay and can be adjusted to spraying consistency by the addition of water. Dark ground coated enamelled iron sheets are dipped in this slip to give a weight of dried enamel of 25 grams per square foot. The coating is then dried and fired at 800° C. A second coat is applied and fired in the same way. The resulting enamel has a brightness of 64% and is white. If the same operations are carried out with the replacement of borax and sodium silicate by the customary addition of 5% of ball clay, the fired enamel has a brightness of 58% but the white has a cream tone.

The term "gel" used herein is meant to designate a dispersed system of jelly-like consistency.

The gels used in the practice of this invention include jellies and gelatinous precipitates containing at least some water and do not include the dehydrated type known generally as dried or solid gels sometimes referred to as xerogels. Such gels when formed by the reaction between an alkali metal silicate and an alkali metal aluminate or borate and employed as herein before described shall be considered as falling within the scope of this invention, which has been illustrated by the examples shown but which is not intended to be limited thereby.

This application is a continuation of my application Serial No. 522,845, filed February 17, 1944, now abandoned.

I claim:

1. A method of preparing, from a white enamel frit, a liquid suspension for use in vitreous enamelling, which consists in suspending the frit particles in a compound inorganic gel formed by the reaction of solutions of sodium silicate containing a ratio of $Na_2O$ to $SiO_2$ within the range of 1:1 to 1:4 and sodium aluminate.

2. A method of producing a white enamel suspension for use in vitreous enamelling, which consists in preparing an enamel frit opacified with titanium oxide and grinding the frit in the presence of a solution of sodium silicate containing a ratio of $Na_2O$ to $SiO_2$ within the range of 1:1 to 1:4 and a solution of sodium aluminate.

3. A frit suspension useful for vitreous enamelling in which the suspending medium is a compound inorganic gel formed by the reaction between solutions of sodium silicate containing a ratio of $Na_2O$ to $SiO_2$ within the range of 1:1 to 1:4 and sodium aluminate.

4. A process of producing a vitreous enamel coating which comprises the steps of preparing, by smelting, an enamel frit opacified with titanium oxide, adding to the frit a solution of sodium silicate containing a ratio of $Na_2O$ to $SiO_2$ within the range of 1:1 to 1:4 and a solution of sodium aluminate, milling the batch to produce a suspension of the required degree of fineness, applying the suspension as a coating to metal ware, and fusing the coating by heat.

STANLEY GEORGE TINSLEY.

REFERENCES CITED

The following references are of record in the file of this patent:

UNITED STATES PATENTS

| Number | Name | Date |
|---|---|---|
| 2,085,129 | Stoewener | June 29, 1937 |

FOREIGN PATENTS

| Number | Country | Date |
|---|---|---|
| 66,065 | Germany | 1892 |

OTHER REFERENCES

Ceramic Industry, Jan. 1944, pp. 103–104.